(12) United States Patent
Shin et al.

(10) Patent No.: US 11,381,144 B2
(45) Date of Patent: Jul. 5, 2022

(54) MOTOR

(71) Applicant: Hanon Systems, Daejeon (KR)

(72) Inventors: Hyeon Jae Shin, Daejeon (KR); Seong Kook Cho, Daejeon (KR); Ho Youn Kim, Daejeon (KR); Jae Won Lee, Daejeon (KR); Ho Bin Im, Daejeon (KR); Kyung Hun Jung, Daejeon (KR)

(73) Assignee: Hanon Systems, Daejeon (KR)

( * ) Notice: Subject to any disclaimer, the term of this patent is extended or adjusted under 35 U.S.C. 154(b) by 103 days.

(21) Appl. No.: 16/620,396

(22) PCT Filed: Jun. 7, 2018

(86) PCT No.: PCT/KR2018/006465
§ 371 (c)(1),
(2) Date: Dec. 6, 2019

(87) PCT Pub. No.: WO2018/226040
PCT Pub. Date: Dec. 13, 2018

(65) Prior Publication Data
US 2020/0091806 A1    Mar. 19, 2020

(30) Foreign Application Priority Data

Jun. 9, 2017    (KR) .......................... 10-2017-0072617
Jun. 5, 2018    (KR) .......................... 10-2018-0064748

(51) Int. Cl.
*H02K 1/27*        (2022.01)
*H02K 29/03*       (2006.01)
(Continued)

(52) U.S. Cl.
CPC ........... *H02K 29/03* (2013.01); *H02K 1/2786* (2013.01); *H02K 21/22* (2013.01); *H02K 2213/03* (2013.01)

(58) Field of Classification Search
CPC ...... H02K 29/03; H02K 1/2786; H02K 21/22; H02K 2213/03; H02K 2201/03; H02K 1/27–1/2793
See application file for complete search history.

(56) References Cited

U.S. PATENT DOCUMENTS

| 6,313,558 B1 | 11/2001 | Abukawa et al. |
| 2008/0169732 A1 | 7/2008 | Chang |

(Continued)

FOREIGN PATENT DOCUMENTS

| CN | 106385154 A | 2/2017 |
| DE | 102015117783 A1 | 4/2017 |

(Continued)

OTHER PUBLICATIONS

Machine Translation, Kawasaki, JP-2009254030-A, Oct. 2009. (Year: 2009).*

*Primary Examiner* — Thomas Truong
(74) *Attorney, Agent, or Firm* — Norton Rose Fulbright US LLP; James R. Crawford

(57) ABSTRACT

The present invention relates to a brushless motor, and an objective of the present invention is to provide a brushless motor which can significantly reduce the cogging torque and torque ripple of the motor by minimizing the rate of change of magnetoresistance in accordance with a change in position of a rotor through the optimization of the shape design of the rotor and a stator, and can also reduce the weight of the brushless motor through the optimization of the shape design taking into consideration the materials of the rotor and the stator.

9 Claims, 8 Drawing Sheets

(51) Int. Cl.
*H02K 1/2786* (2022.01)
*H02K 21/22* (2006.01)

(56) References Cited

U.S. PATENT DOCUMENTS

| | | | |
|---|---|---|---|
| 2016/0197525 A1* | 7/2016 | Cho | H02K 1/146 310/60 R |
| 2016/0329790 A1 | 11/2016 | Li et al. | |

FOREIGN PATENT DOCUMENTS

| | | | |
|---|---|---|---|
| JP | H08322167 A | | 12/1996 |
| JP | 2009254030 A | * | 10/2009 |
| JP | 2009254030 A | | 10/2009 |
| JP | 5646119 B1 | | 12/2014 |
| JP | 2015-019485 A | | 1/2015 |
| KR | 10-2016-0024801 A | | 3/2016 |
| KR | 10-2016-0080500 A | | 7/2016 |
| KR | 2017-0044934 A | | 4/2017 |
| WO | 2008035851 A1 | | 3/2008 |

* cited by examiner

FIG. 9A
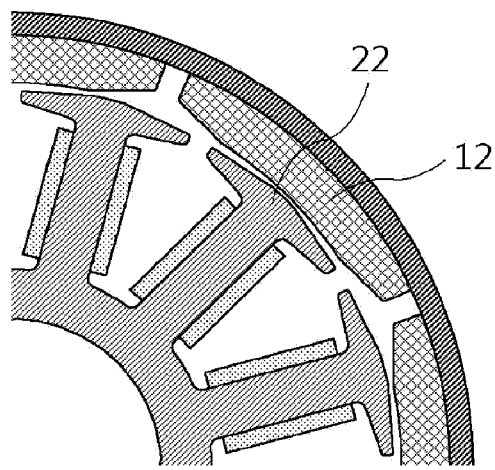
WEIGHT : 0.791
COGGING TORQUE : 0.100
(A)
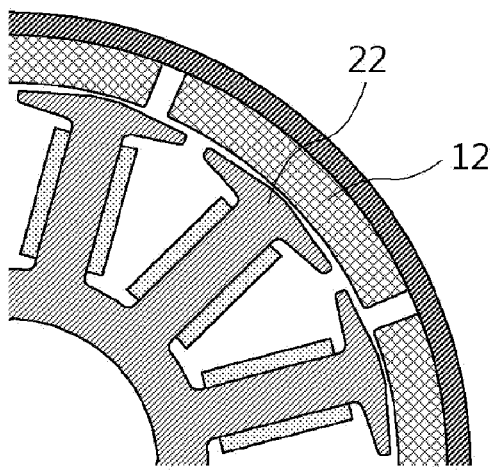
WEIGHT : 0.798
COGGING TORQUE : 0.227
(B)
FIG. 9B
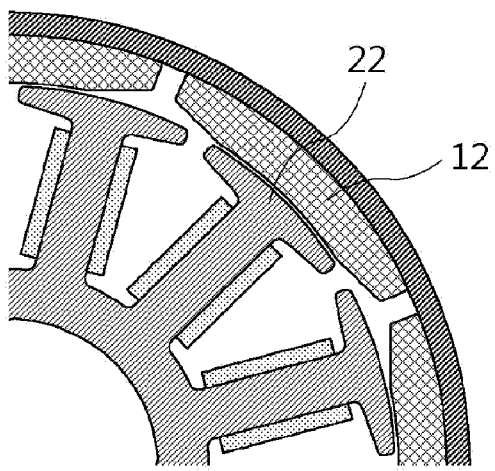
WEIGHT : 0.802
COGGING TORQUE : 0.179
(C)
FIG. 9C

MOTOR

This application is a national phase under 35 U.S.C. § 371 of International Application No. PCT/KR2018/006465 filed Jun. 7, 2018, which claims priority from Korean Patent Application Nos. 10-2017-0072617 filed Jun. 9, 2017 and 10-2018-0064748 filed Jun. 5, 2018. The entire contents of these applications are incorporated herein by reference in their entirety.

TECHNICAL FIELD

The present invention relates to a motor, and more particularly, to a motor in which a rotor rotates outside a stator and a permanent magnet is provided in the rotor.

BACKGROUND ART

In general, a motor is a device converting electrical energy into mechanical energy in a magnetic field in which a current flows, and may be classified according to various references such as a type of power supply, positions of a rotor and a stator, and whether or not to use a permanent magnet.

For example, the motor is divided into a direct current (DC) motor and an alternating current (AC) motor according to the type of power supply, and the DC motor is divided into a brush motor and a brushless motor.

Among the DC motors, a motor to which a brush is attached serves to allow a current to flow to a coil and commutate the current by a contact between a commutator and the brush, but has a disadvantage that mechanical and electrical noises are generated and the brush is worn. In order to overcome such a disadvantage, the brushless motor without using the brush has been widely used. A brushless DC motor is a motor in which the brush and the commutator are removed from the DC motor and an electronic commutation mechanism is installed, and is also called a non-commutator motor.

In addition, the motor may also be divided into an inner rotor-type motor and a brushless motor according to relative positions of the rotor and the stator. FIGS. 1 and 2 illustrate an example of a brushless motor. The brushless motor illustrated in FIGS. 1 and 2 is configured to include a rotor 110 having permanent magnets 112 provided on an inner peripheral surface of a rotor core 111 and a stator 120 having pole shoes 122 formed at tips of teeth 121 around which coils 125 are wound.

Meanwhile, when the motor rotates, magnitudes of a magnetoresistance hindering a magnetic flux from flowing are different from each other depending on a position of the rotor 110, and a pulsation of a torque is generated due to such a difference in the magnetoresistance. Such a permanent magnet-type motor, a torque generated at the time of rotation of the rotor before power is applied to the coil is called a cogging torque, and the motor has a virtual vibration source for vibrations and a noise due to the cogging torque. As a result, vibrations and a noise are caused in a cooling fan or the like, which is a motor driving system.

The cogging torque has been known to be proportional to a rate of change in a magnetoresistance depending on a change in a position of the rotor. In order to reduce such a cogging torque, in the teeth 122 according to the related art illustrated in FIGS. 1 and 2, notches 124 are formed in facing surfaces 123 of the teeth facing the permanent magnets 112. The teeth 122 are formed to extend in a circumferential direction of the rotor core 111 so that a magnetic flux of the stator 120 is transferred to the rotor 110, and a plurality of notches 124 are formed along the circumferential direction of the rotor core 111 in the facing surface 123 of the teeth 121.

However, even in a case where the notches 124 are formed, there is still a large difference in a rate of change in the magnetoresistance depending on a rotation angle, and thus, there is a problem in that the noise and the vibrations are not greatly reduced. Therefore, there is a need to improve noise and vibration characteristics of the motor by reducing a torque ripple, which is a variation width in the cogging torque of the motor.

Meanwhile, the stator 120 is generally formed of an electrical sheet. The electrical sheet refers to a plate formed of steel having a higher content of silicon than that of a general steel sheet and having excellent electrical and magnetic properties. Particularly, a non-oriented electrical sheet whose crystals of an inner portion are oriented respectively has been widely used in a general rotary machine such as a general-purpose motor, a small motor or the like. However, since the electrical sheet has a higher density than that of a material of the permanent magnet, as a volume of the stator 120 becomes large, a weight of the motor itself is increased. Therefore, it is necessary to introduce a design for reducing the weight of the motor itself.

Various studies have been conducted in order to improve performance of the cogging torque and the torque ripple, and an example of these studies is disclosed in Korean Patent Laid-Open Publication No. 2017-0044934 (entitled "Rotor and Motor Having W-Type Permanent Magnet Disposition" and published on Apr. 26, 2017) (hereinafter, referred to as Related Document 1). Related Art Document 1 discloses a configuration in which a cogging torque and a torque ripple are improved by disposing permanent magnets in a W shape. However, even with Related Art Document 1, there is a limitation that it is difficult to obtain performance of improving the cogging torque and the torque ripple as much as sufficiently necessary and a reduction in the weight of the motor is not considered at all.

RELATED ART DOCUMENT

Patent Document

1. Korean Patent Laid-Open Publication No. 2017-0044934 (entitled "Rotor and Motor Having W-Type Permanent Magnet Disposition" and published on Apr. 26, 2017)

DISCLOSURE

Technical Problem

The present invention has been made to solve the problems of the motor according to the related art as described above, and an object of the present invention is to provide a brushless motor whose cogging torque and torque ripple may be significantly reduced by minimizing a rate of change in a magnetoresistance depending on a change in a position of a rotor through optimization of shape designs of the rotor and a stator. Further, another object of the present invention is to provide a brushless motor whose weight may be reduced by optimizing shape designs in consideration of materials of a rotor and a stator.

Technical Solution

In one general aspect of the present invention, a motor including: a rotor 10 including a plurality of permanent magnets 12 disposed on an inner peripheral surface of a rotor core 11; and a stator 20 including a plurality of teeth 21 disposed along a circumferential direction of a stator core and pole shoes 22 formed at distal ends of the teeth 21 facing the permanent magnets 12, wherein when the rotor 10 rotates, the permanent magnet 12 becomes gradually close to an outer peripheral surface 23 of a central portion of the pole shoe 22, passes through the outer peripheral surface 23 of the central portion of the pole shoe 22, and then becomes gradually distant from the outer peripheral surface 23 of the central portion of the pole shoe 22. In this case, an inner peripheral surface 13 of a central portion of the permanent magnet 12 may be formed in a curved surface shape having a predetermined curvature, and inner peripheral surfaces 14 of both end portions of the permanent magnet 12 may be formed so that the inner peripheral surfaces 14 become distant from an outer peripheral surface of the pole shoe 22 as the inner peripheral surfaces 14 become distant from the central portion. In addition, outer peripheral surfaces 24 of both end portions of the pole shoe 22 may be formed so that the outer peripheral surfaces 24 become distant from the inner peripheral surface of the permanent magnet 12 as the outer peripheral surfaces 24 become distant from the central portion.

That is, in one general aspect of the present invention, a motor includes: a rotor 10 including a rotor core 11 and a plurality of permanent magnets 12 disposed on an inner peripheral surface of the rotor core 11 so as to be spaced apart from each other along a circumferential direction; and a stator 20 disposed inside the rotor 10 and including a plurality of teeth 21 disposed to be spaced apart from each other along a circumferential direction of a stator core and pole shoes 22 formed at distal ends of the teeth 21 facing the permanent magnets 12, wherein an inner peripheral surface 13 of a central portion of the permanent magnet 12 is formed in a curved surface shape having a predetermined curvature, and inner peripheral surfaces 14 of both end portions of the permanent magnet 12 are formed so that the inner peripheral surfaces 14 become distant from an outer peripheral surface of the pole shoe 22 as the inner peripheral surfaces 14 become distant from the central portion or outer peripheral surfaces 24 of both end portions of the pole shoe 22 are formed so that the outer peripheral surfaces 24 become distant from the inner peripheral surface of the permanent magnet 12 as the outer peripheral surfaces 24 become distant from the central portion.

In this case, the inner peripheral surfaces 14 of both end portions of the permanent magnet 12 may have a planar shape.

In this case, the inner peripheral surfaces 14 of both end portions of the permanent magnet 12 may be formed at a predetermined angle $\alpha$ with respect to a tangent of the inner peripheral surface 13 of the central portion of the permanent magnet 12 at points where the central portion and both end portions of the permanent magnet 12 meet each other.

In this case, the angle $\alpha$ between the inner peripheral surfaces 14 of both end portions of the permanent magnet 12 and the tangent of the inner peripheral surface 13 of the central portion of the permanent magnet 12 may satisfy a relationship of $9°\le\alpha\le20°$.

In addition, the inner peripheral surfaces 14 of both end portions of the permanent magnet 12 may be positioned on the same plane.

In this case, the inner peripheral surfaces of the permanent magnet 12 may be formed to be symmetrical to each other with respect to a center line CL of the permanent magnet 12.

In this case, when a distance from a center C of rotation of the rotor 10 to a distal end of a center of the pole shoe 22 is D2 and a distance from the center C of rotation of the rotor 10 to the inner peripheral surfaces 14 of both end portions of the permanent magnet 12 is D1, it is preferable that a relationship of D1<D2 is satisfied.

In addition, when an angle between distal ends of both end portions of the permanent magnet 12 with respect to a center C of rotation of the rotor 10 is $\theta 1$ and an angle between both distal ends of the inner peripheral surface 13 of the central portion of the permanent magnet 12 is $\theta 2$, it is preferable that a relationship of $0.65\le\theta 2/\theta 1\le 0.67$ or $0.84\le\theta 2/\theta 1\le 0.86$ is satisfied.

In this case, when an angle between both distal ends of the pole shoe 22 with respect to the center C of rotation of the rotor 10 is $\theta 3$, it is preferable that a relationship of $\theta 2<\theta 3$ is satisfied.

The outer peripheral surface 23 of the central portion of the pole shoe 22 may be formed in a curved surface shape having a predetermined curvature.

In this case, when an angle between both distal ends of the outer peripheral surface 23 of the central portion of the pole shoe 22 with respect to a center C of rotation of the rotor 10 is $\theta 4$, it is preferable that a relationship of $0°\le\theta 4\le 1.5°$ is satisfied.

In addition, the outer peripheral surfaces 24 of both end portions of the pole shoe 22 may have a planar shape.

In this case, when an angle between the outer peripheral surfaces 24 of both end portions of the pole shoe 22 and a tangent of the outer peripheral surface 23 of the central portion of the pole shoe 22 at points where the central portion and both end portions of the pole shoe 22 meet each other is $\beta$, it is preferable that a relationship of $7°\le\beta\le 9°$ is satisfied.

In addition, the inner peripheral surfaces 14 of both end portions of the permanent magnet 12 may have a planar shape, the inner peripheral surfaces 14 of both end portions of the permanent magnet 12 may be formed at a predetermined angle $\alpha$ with respect to a tangent of the inner peripheral surface of the central portion at points where the central portion and both end portions of the permanent magnet 12 meet each other, the outer peripheral surfaces 24 of both end portions of the pole shoe 22 may have a planar shape, distal ends of the outer peripheral surfaces 24 of both end portions of the pole shoe 22 may be formed to be spaced apart from an extension line of the outer peripheral surface 23 of the central portion of the pole shoe 22 by a predetermined distance L2 in a radial direction, and it is preferable that an angle $\alpha$ between the inner peripheral surfaces 14 of both end portions of the permanent magnet 12 and a tangent of the inner peripheral surface 13 of the central portion of the permanent magnet at points where the central portion and both end portions of the permanent magnet 12 meet each other and an angle $\beta$ between the outer peripheral surfaces 24 of both end portions of the pole shoe 22 and a tangent of the outer peripheral surface 23 of the central portion of the pole shoe 22 at points where the central portion and both end portions of the pole shoe 22 meet each other satisfy a relationship of $\alpha>\beta$.

Advantageous Effects

In a motor according to the present invention, there is an effect of significantly reducing a cogging torque and significantly reducing a noise and vibrations of the motor by minimizing a change in a magnetoresistance according to rotation of a rotor. More specifically, in a brushless motor according to the present invention, a central portion of an inner peripheral surface of a permanent magnet is formed in a cylindrical shape and both end portions of the inner peripheral surface of the permanent magnet are formed in a chamfered shape, such that when a rotor rotates from an end of one pole of the permanent magnet to the next pole, a change in a magnetoresistance is gradually reduced and is then gradually increased again. Therefore, an effect of significantly reducing a cogging torque may be obtained. In addition, in the brushless motor according to the present invention, both distal ends of an outer peripheral surface of a stator pole shoe have a chamfered shape to increase the effect as described above, such that an effect of further reducing the cogging torque may be obtained.

Furthermore, in the brushless motor according to the present invention, the stator pole shoe formed of an electrical sheet to have a density higher than that of the permanent magnet is formed in the chamfered shape, such that an effect of more effectively reducing a weight of a component formed of a material having a high density and significantly reducing a weight of the motor itself ultimately may be obtained.

DESCRIPTION OF DRAWINGS

FIGS. 9A to 9C are views illustrating forms of a stator and a rotor of the brushless motor according to an exemplary embodiment of the present invention and several comparative examples.

Figure 1:
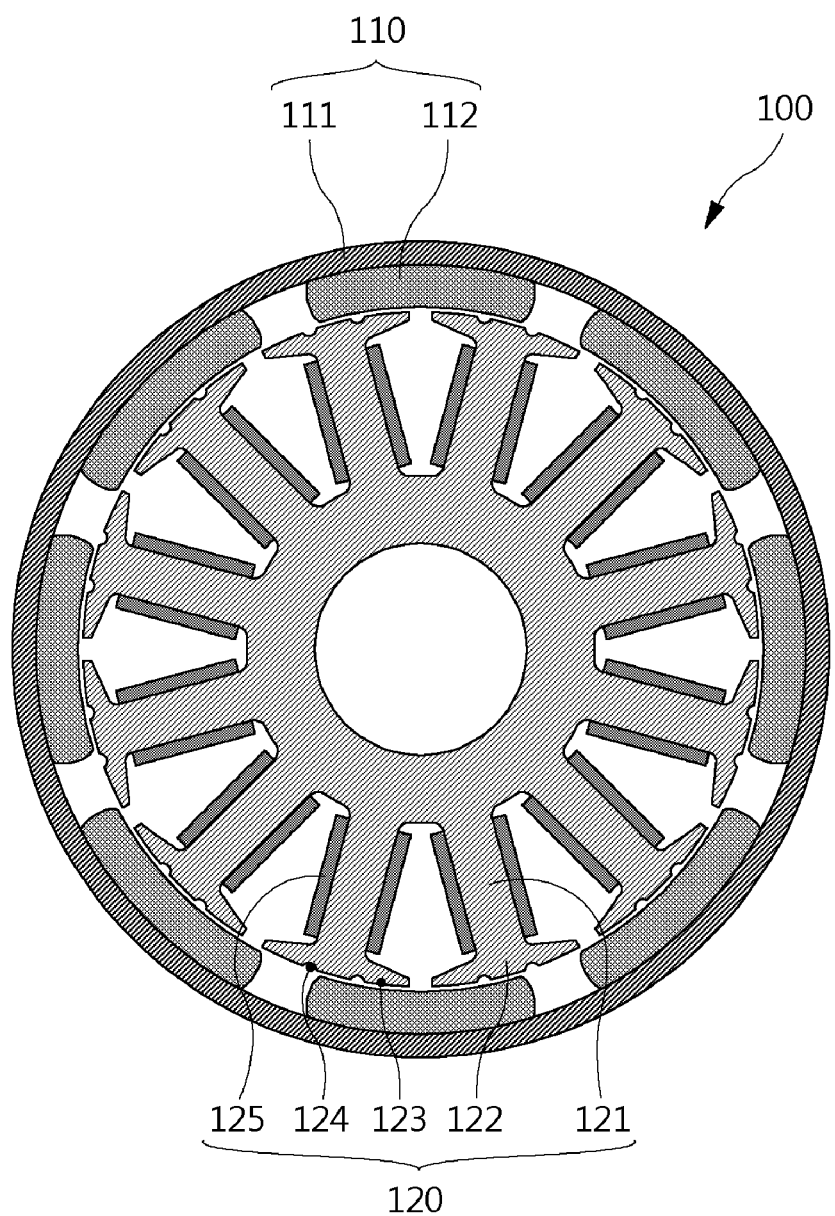
FIG. 1 is a cross-sectional view illustrating a brushless motor according to the related art.

DETAILED DESCRIPTION OF MAIN ELEMENTS 10, 110: rotor
11, 111: rotor core
12, 112: permanent magnet
13: inner peripheral surface of central portion of permanent magnet
14: inner peripheral surfaces of both end portions of permanent magnet
20, 120: stator
21, 121: stator teeth
22, 122: pole shoe
23: outer peripheral surface of central portion of pole shoe
24: outer peripheral surfaces of both end portions of pole shoe
25, 125: coil
C: center of rotation of rotor
CL: center line of permanent magnet

Best Mode

Figure 3:
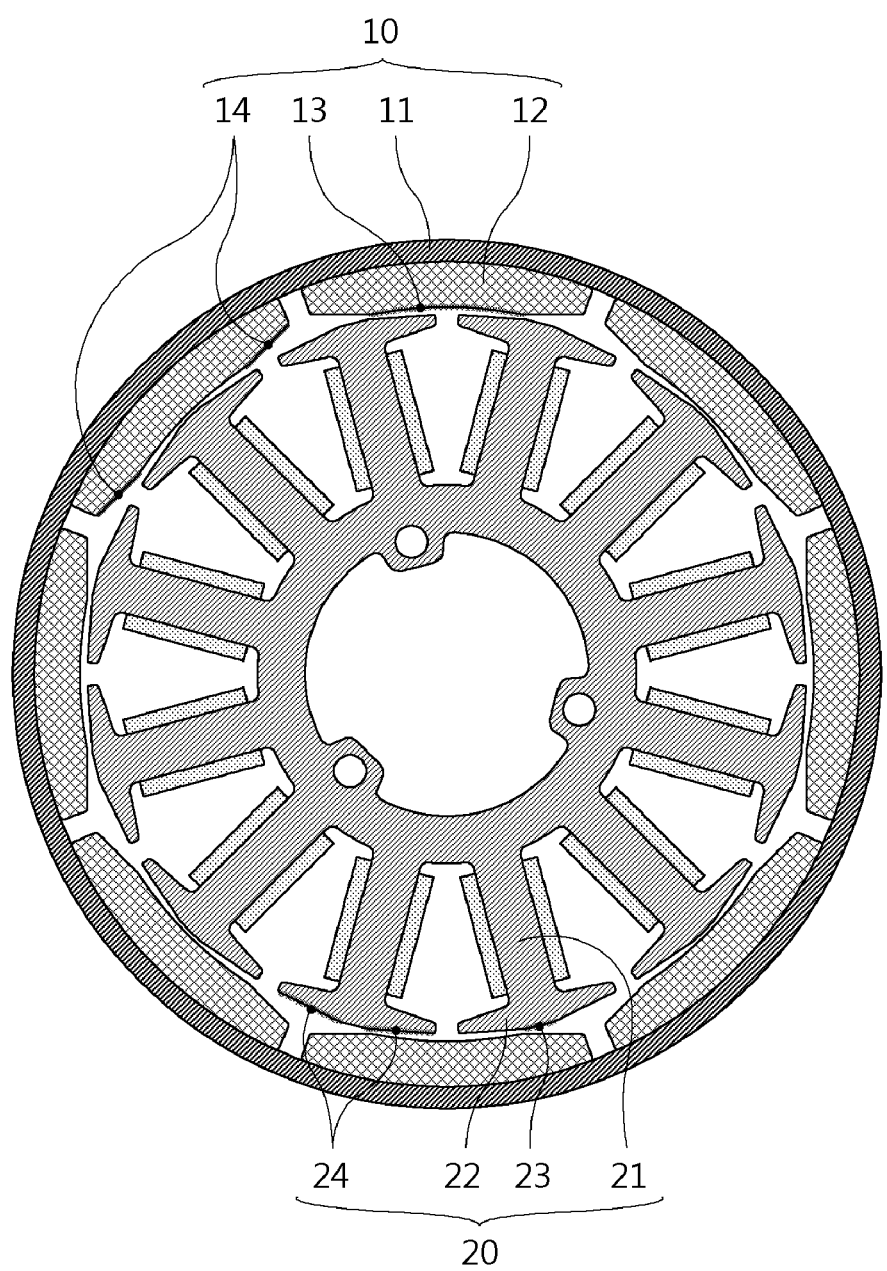
FIG. 3 is a cross-sectional view illustrating a brushless motor according to an exemplary embodiment of the present invention.

FIG. 3 is a cross-sectional view illustrating a brushless motor according to an exemplary embodiment of the present invention. First, a basic structure of the brushless motor will be described with reference to FIG. 3.

As illustrated in FIG. 3, the brushless motor 100 according to the present invention is configured to include a rotor 10 including a rotor core 11 and a plurality of permanent magnets 112 disposed on an inner peripheral surface of the rotor core 11 so as to be spaced apart from each other along a circumferential direction; and a stator 20 disposed inside the rotor 10 and including a plurality of teeth 21 disposed to be spaced apart from each other along the circumferential direction and pole shoes 22 formed at distal ends of the teeth 21 facing the permanent magnets 12.

The rotor 10 is rotatably formed, and may be formed by coupling the plurality of permanent magnets 12 to the rotor core 11 having a cylindrical shape. In this case, the permanent magnets 12 may be disposed on the inner peripheral surface of the rotor core 11 so as to be spaced apart from each other along the circumferential direction. In addition, the permanent magnets 12 each have an N pole and an S pole, and are disposed so that the N pole is positioned on an inner peripheral surface of one permanent magnet 12 and are disposed so that the S pole is positioned on an inner peripheral surface of the neighboring permanent magnet 12, such that the plurality of permanent magnets may be disposed so that positions of the N poles and the S poles are alternated.

The stator 20 is a portion fixed to a housing or the like of the motor, may be disposed in an empty portion of the center of an inner side of the rotor 10, and may be disposed at an inner side surrounded by the permanent magnets 12 so as to be spaced apart from the permanent magnets 12 by a predetermined interval. In addition, a plurality of teeth 21 may be formed to extend outward from the center of an outer peripheral surface of the stator core, and may be disposed to be spaced apart from each other in a circumferential direction of the stator core. In addition, the pole shoes 22 are formed at outer end portions of the teeth 21, respectively. The pole shoes 22 are formed in a shape in which both ends thereof in the circumferential direction protrude from the teeth 21, such that the teeth 21 and the pole shoes 22 may be formed in a "T" shape, as illustrated. In addition, pole shoes 22 formed at neighboring teeth 21 to face each other may be formed to be spaced apart from each other by a predetermined interval. In addition, coils 25 may be wound around the teeth 21, and may be disposed between the outer peripheral surface of the stator core and the pole shoes 22.

In FIG. 3, the rotor 10 is provided with eight permanent magnets 12, and the stator 20 is provided with twelve teeth 21. This is only an example, and ten permanent magnets and twelve teeth may also be formed, and the numbers of permanent magnets and teeth may be changed, if necessary.

It may be seen from the following Equation 1 that when a change in a magnetoresistance (dR) with respect to a change in a rotation angle (dθ) of the rotor is reduced in a state where a magnetic flux (Φ) is not changed, a cogging torque is reduced.

$$T_{cogging} = -\frac{1}{2}\Phi_g^2 \frac{dR}{d\theta} \qquad \text{[Equation 1]}$$

Figure 2:
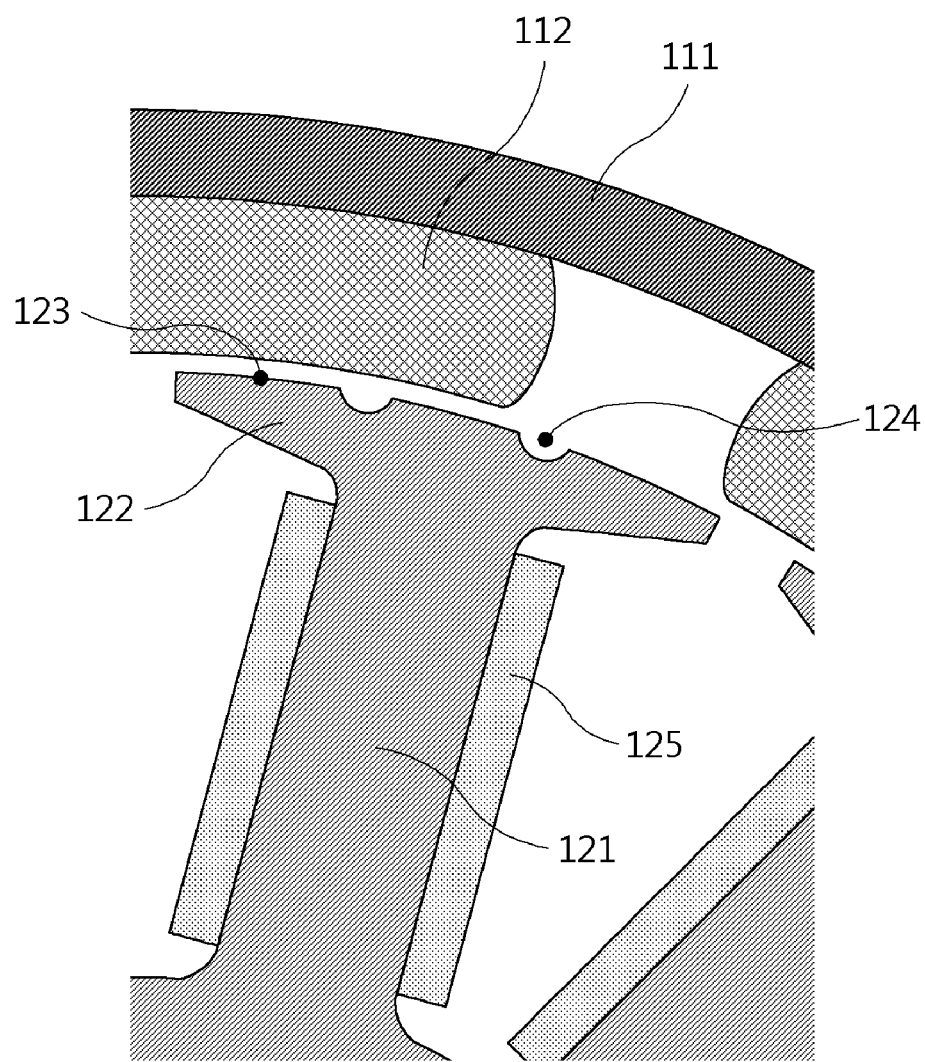
FIG. 2 is a partially enlarged view of the brushless motor illustrated in FIG. 1.

In the pole shoe 122 illustrated in FIG. 2 according to the related art, since a distance between the facing surface and the permanent magnet 112 is constant, there is no change in a magnetoresistance in a section of the permanent magnet 112, but a magnetoresistance is rapidly reduced in a section in which the permanent magnet 112 is not present. Therefore, a rate of change in the magnetoresistance cannot but be large.

In the present invention, the problem of the cogging torque and the torque ripple as described above is improved by improving shapes of the rotor 10 and the stator 20, more specifically, shapes of the permanent magnet 12 and the pole shoe 22. Hereinafter, a shape improvement design of the permanent 12 will be first described, and a shape improvement design of the pole shoe 22 will be then described.

Shape Improvement Design of Permanent Magnet

Figure 4:
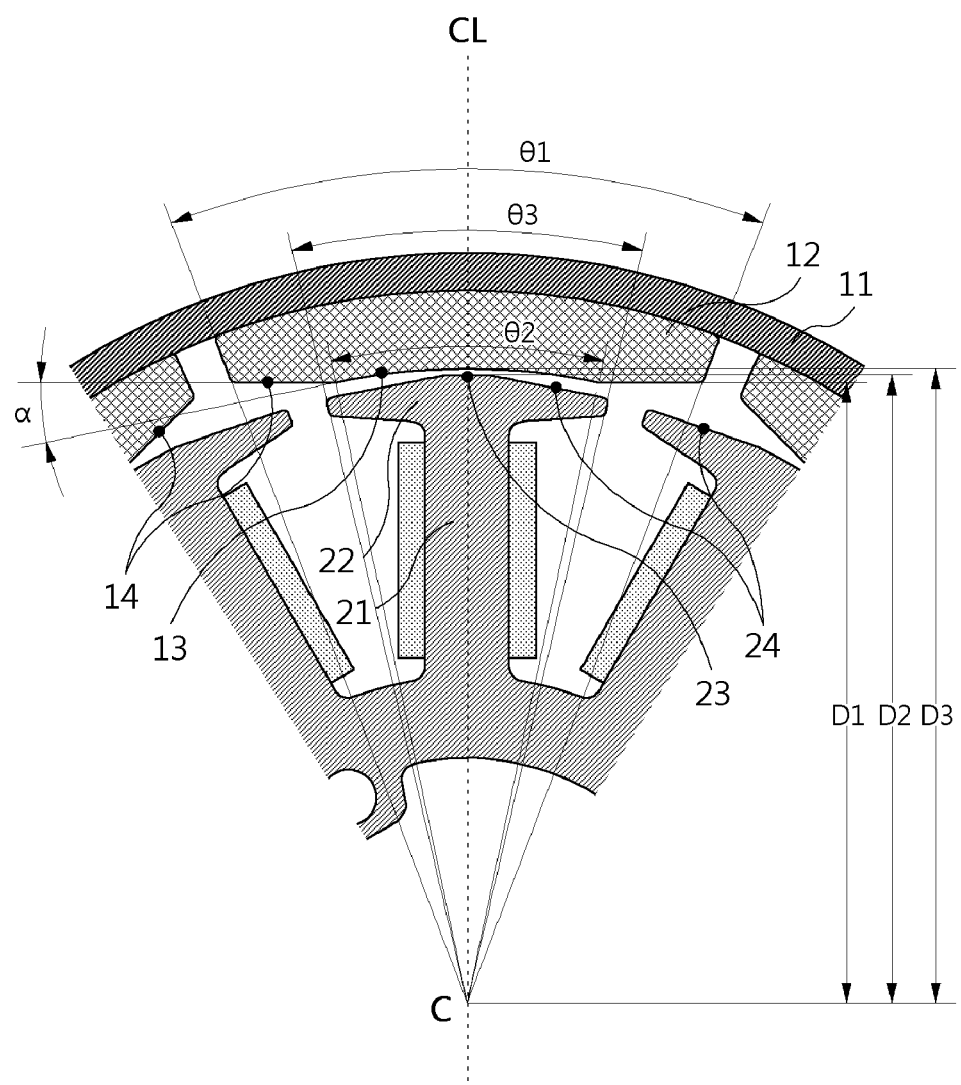
FIG. 4 is a partially enlarged view (a detailed configuration of a rotor) of the brushless motor according to an exemplary embodiment of the present invention.

FIG. 4 is a partially enlarged view illustrating the brushless motor according to an exemplary embodiment of the present invention, and illustrates particularly a shape improvement design matter of the permanent magnet 12 in detail.

As illustrated in FIGS. 3 and 4, in the present invention, an inner peripheral surface 13 of a central portion of the permanent magnet 12 may be formed in a curved surface shape having a predetermined curvature, and inner peripheral surfaces 14 of both end portions of the permanent magnet 12 may be formed so that they become distant from an outer peripheral surface of the pole shoe 22 as they become distant from the central portion.

Therefore, a magnetoresistance is gradually reduced from the central portion of the permanent magnet 12 toward both end portions thereof, and a difference between a magnetoresistance at the end portions of the permanent magnet 12 and a magnetoresistance in a section in which the permanent magnet 12 is not present is reduced. In other words, before the pole shoe 22 passes through the section in which the permanent magnet 12 is not present, the magnetoresistance is reduced in advance at the end portions of the permanent magnet 12. Therefore, it is possible to reduce a rate of change in the magnetoresistance in the entire rotation section regardless of a shape of the pole shoe 22. As a result, the cogging torque may be significantly reduced to reduce vibrations and a noise of the motor.

The inner peripheral surfaces 14 of both end portions of the permanent magnet 12 may be formed in a planar shape. In this case, the inner peripheral surfaces 14, which are planes, of both end portions of the permanent magnet 12, may be formed at a predetermined angle α with respect to a tangent of the inner peripheral surface of the central portion at points where the central portion and both end portions of the permanent magnet meet each other. Therefore, it is possible to obtain an effect of gradually reducing and then gradually increasing again a change in the magnetoresistance while the rotor rotates. In addition, although not illustrated, the inner peripheral surfaces 14 of both end portions of the permanent magnet 12 may be formed in a curved surface shape instead of the planar shape as long as they satisfy a condition that they become distant from the outer peripheral surface of the pole shoe 22 as they become distant from the central portion.

It is preferable that 9°≤α≤20° in which α is the angle between the inner peripheral surfaces 14 of both end portions of the permanent magnet 12 and the tangent of the inner peripheral surface of the central portion. In a case where the angle α is less than 9°, an amount of reduction in the magnetoresistance is excessively small, such that a large difference is generated between the magnetoresistance at both end portions of the permanent magnet 12 and the magnetoresistance in the section in which the permanent magnet 12 is not present. As a result, an amount of change in the magnetoresistance cannot be significantly reduced. In addition, in a case where the angle α exceeds 20°, a difference between the magnetoresistance at both end portions of the permanent magnet 12 and the magnetoresistance in the section in which the permanent magnet 12 is not present is small, but a large difference is generated between the magnetoresistance at the central portion of the permanent magnet 12 and the magnetoresistance at both end portions of the permanent magnet 12, and an amount of change in the magnetoresistance in the permanent magnet 12 thus becomes excessively large. In a case where the angle α is 9° or more to 20° or less, the difference between the magnetoresistance at both end portion of the permanent magnet 12 and the magnetoresistance in the section in which the permanent magnet 12 is not present is significantly reduced, and the difference between the magnetoresistance at the central portion of the permanent magnet 12 and the magnetoresistance at both end portions of the permanent magnet 12 is not large, such that a rate of change in the entire magnetoresistance may be minimized.

In addition, the inner peripheral surfaces 14 of both end portions of the permanent magnet 12 may be positioned on the same plane. In addition, the inner peripheral surfaces 13 and 14 of the permanent magnet 12 may be formed to be symmetrical to each other with respect to a center line CL of the permanent magnet. Therefore, the change in the magnetoresistance is constantly generated symmetrically with respect to the center line of the permanent magnet, such that an irregular change in the magnetoresistance may be prevented.

As illustrated in FIG. 4, when a distance from the center C of rotation of the rotor 10 to a distal end of the center of the pole shoe 22 is D2, a distance from the center C of rotation of the rotor 10 to the inner peripheral surfaces 14 of both end portions of the permanent magnet 12 is D1, and a distance from the center C of rotation of the rotor 10 to the inner peripheral surface 13 of the central portion of the permanent magnet 12 is D3, it is preferable to satisfy a relationship of D1<D2.

The inner peripheral surface 13 of the central portion of the permanent magnet 12 is a surface having a radius of curvature of D3, and the pole shoe 22 rotates while maintaining a predetermined interval (D3−D2) from the inner peripheral surface 13 of the central portion. In order to reduce loss of motor efficiency, the interval (D3−D2) may be formed to be small (1 mm or less). In addition, as D1 becomes close to D3, a length of the central portion of the permanent magnet 12 is reduced and lengths of both end portions of the permanent magnet 12 are increased, such that an amount of change in the magnetoresistance at both the end portions of the permanent magnet and the section in which the permanent magnet is not present is reduced, but a magnetic force of the permanent magnet is weakened, and performance of the motor may thus be deteriorated. In order to overcome this problem, D1 is formed to be smaller than D2, such that the central portion of the permanent magnet 12 may be formed at a sufficient length to maintain the performance of the motor.

As illustrated in FIG. 4, when an angle between distal ends of both end portions of the permanent magnet 12 with respect to the center C of rotation of the rotor 10 is θ1 and an angle between both distal ends of the inner peripheral surface 13 of the central portion of the permanent magnet 12 is θ2, the length of the central portion of the permanent magnet is changed depending on the angle θ2 between both distal ends of the inner peripheral surface 13 of the central portion of the permanent magnet 12, and a cogging torque of the motor is changed accordingly.

Figure 7:
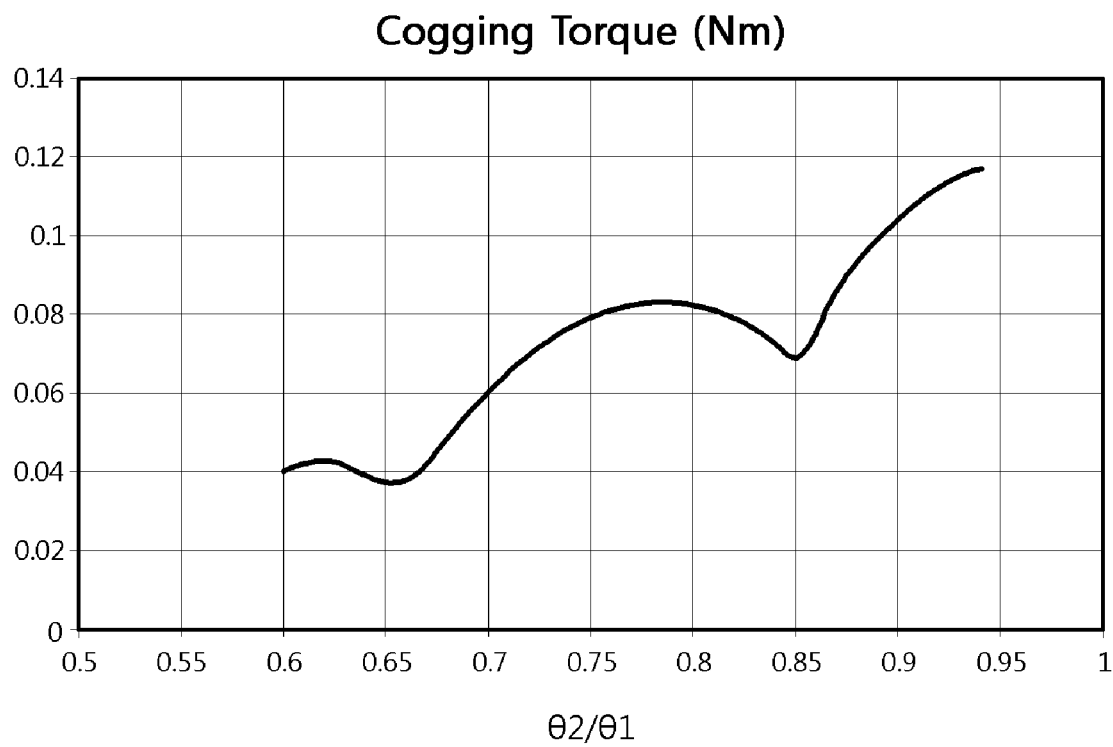
FIG. 7 is a graph illustrating a cogging torque of the brushless motor according to an exemplary embodiment of the present invention depending on θ2/θ1.

FIG. 7 is a graph illustrating a change in a cogging torque depending on θ2/θ1. In a case where a value of θ2/θ1 is less than 0.6, the length of the central portion of the permanent magnet 12 is reduced as described above, such that it is difficult to maintain the performance of the motor. Therefore, in FIG. 7, a result for a change in a cogging torque depending on the value of θ2/θ1 in a case where the value of θ2/θ1 is 0.6 or more, derived through a repeated test, is illustrated.

As illustrated, basically, as the value of θ2/θ1 is increased, the cogging torque is increased. However, it may be seen that the cogging torque is reduced in a section in which the value of θ2/θ1 is about 0.66 and a section in which the value of θ2/θ1 is about 0.85 as compared with adjacent sections. Therefore, in the brushless motor according to the present invention, the value of θ2/θ1 may be about 0.66 or about 0.85 so as to maximize a reduction effect of the cogging torque while considering driving performance of the brushless motor.

More preferably, the value of θ2/θ1 of the brushless motor according to the present invention may be determined to be about 0.85 at which configuration performance of the brushless motor is more excellent as compared with reduction efficiency of the cogging torque.

In addition, when an angle between both distal ends of the pole shoe 22 with respect to the center C of rotation of the rotor 10 is θ3, it is preferable to satisfy a relationship of θ2<θ3. The reason is that the length of the pole shoe 22 needs to be long enough to cover at least the entirety of the central portion of the permanent magnet 12 in order to maintain the performance of the motor.

Shape Improvement Design of Pole Shoe

Figure 5:
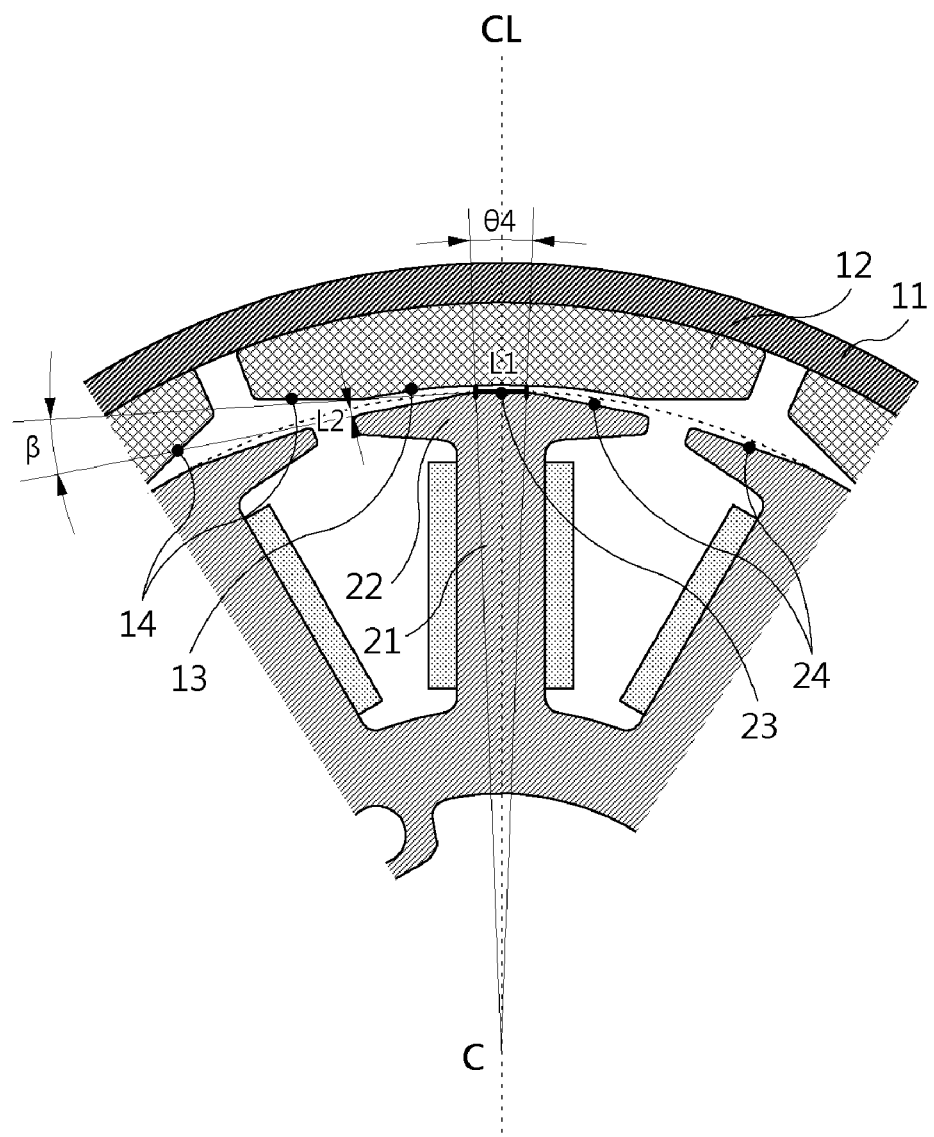
FIG. 5 is a partially enlarged view (a detailed configuration of a stator) of the brushless motor according to an exemplary embodiment of the present invention.

FIG. 5 is a partially enlarged view illustrating the brushless motor according to an exemplary embodiment of the present invention, and illustrates particularly a shape improvement design matter of the pole shoe 22 in detail.

As described above, in the brushless motor according to the present invention, the central portion of the permanent magnet 12 is formed in a cylindrical shape and both end portions of the permanent magnet 12 are formed in a chamfered shape, such that when the rotor rotates from an end of one pole of the permanent magnet to the next pole, the change in the magnetoresistance is gradually reduced and is then gradually increased again. Since it is known that the cogging torque is reduced when the change in the magnetoresistance (dR) with respect to the change in the rotation angle (dθ) of the rotor is reduced as shown in Equation 1, it may be theoretically confirmed that the cogging torque may be certainly reduced due to shape improvement of the permanent magnet 12. Shape improvement of the pole shoe 22 is also made from a similar viewpoint.

That is, as illustrated in FIG. 5, in the present invention, outer peripheral surfaces 24 of both end portions of the pole shoe 22 may be formed so that they become distant from the inner peripheral surface of the permanent magnet 12 as they become distant from the central portion.

Therefore, (as in the permanent magnet 12), when the rotor rotates from an end of one pole to the next pole, the change in the magnetoresistance is gradually reduced and is then gradually increased again due to a shape of the pole shoe 22. That is, as illustrated in FIG. 5, both end portions of the pole shoe 22 are formed in the chamfered shape, such that a cogging torque reduction effect obtained by forming both end portions of the permanent magnet 12 in a chamfered shape may be obtained. In a case where both end portions of the pole shoe 22 are formed in the chamfered shape as described above, even though the inner peripheral surface of the permanent magnet 12 is formed in a non-chamfered shape, the cogging torque reduction effect may be obtained, and when both end portions of the permanent magnet 12 are chamfered, the cogging torque reduction effect may be maximized.

Figure 6:
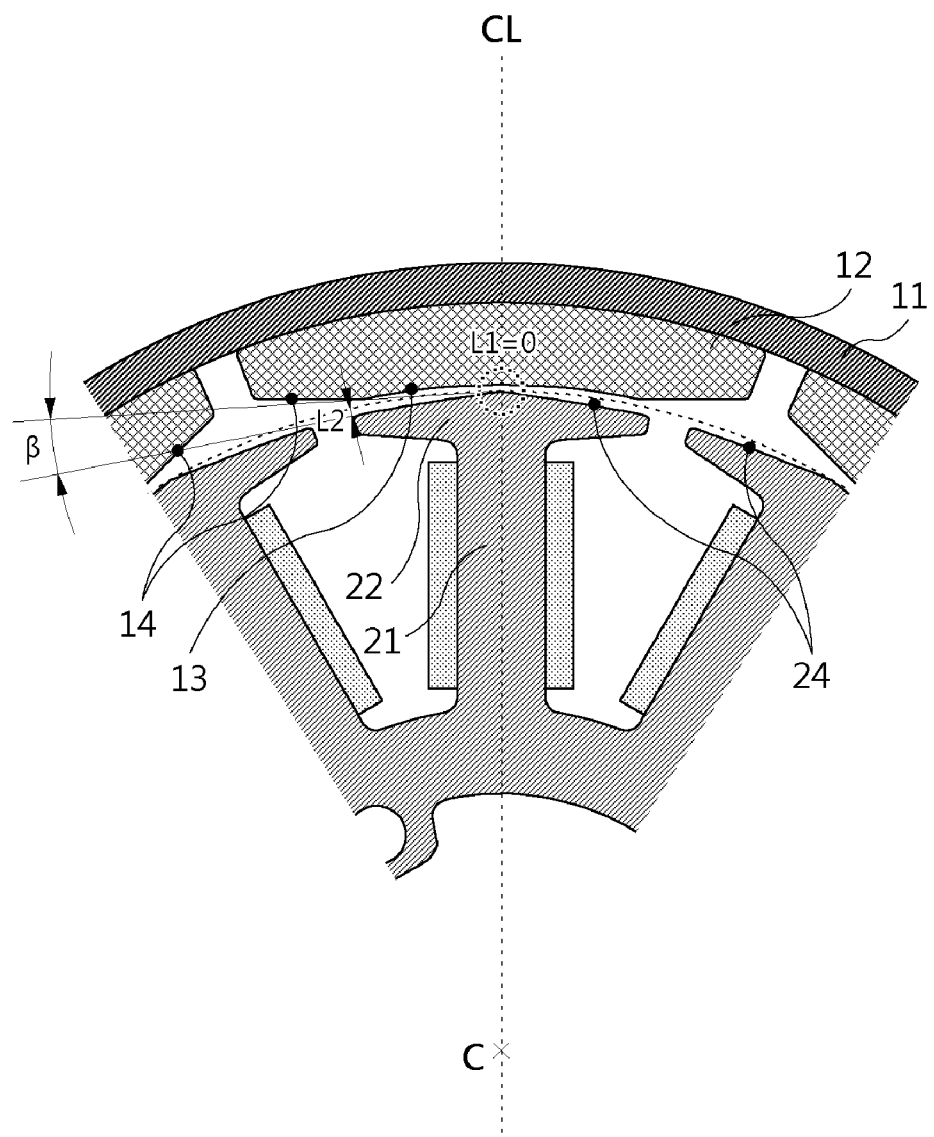
FIG. 6 is a partially enlarged view (another example of a stator) of the brushless motor according to an exemplary embodiment of the present invention.

An outer peripheral surface 23 of a central portion of the pole shoe 22 may be formed in a curved surface shape having a predetermined curvature, as illustrated in FIG. 5. As illustrated in FIG. 5, an angle between both distal ends of the outer peripheral surface 23 of the central portion of the pole shoe 22 with respect to the center C of rotation of the rotor 10 is θ4. In this case, a portion corresponding to θ4 may be formed at a predetermined length L1. Alternatively, as illustrated in FIG. 6, both end portions of the pole shoe 22 are completely chamfered, such that the central portion of the pole shoe 22 may be formed in a vertex shape. That is, FIG. 5 illustrates a case where the length L1 of the outer peripheral surface 23 of the central portion of the pole shoe 22 has a value larger than 0, and FIG. 6 illustrates a case where the length L1 of the outer peripheral surface 23 of the central portion of the pole shoe 22 is 0, that is, a case where the central portion of the pole shoe 22 is formed in a substantially vertex shape. In this case, as the length L1 of the outer peripheral surface 23 of the central portion of the pole shoe 22 becomes long, regions of the chamfered portions are reduced, and an amount of change in the magnetoresistance thus becomes more rapid, such that the cogging torque reduction effect becomes small, and as the length L1 becomes short, the cogging torque reduction effect becomes large.

Figure 8:
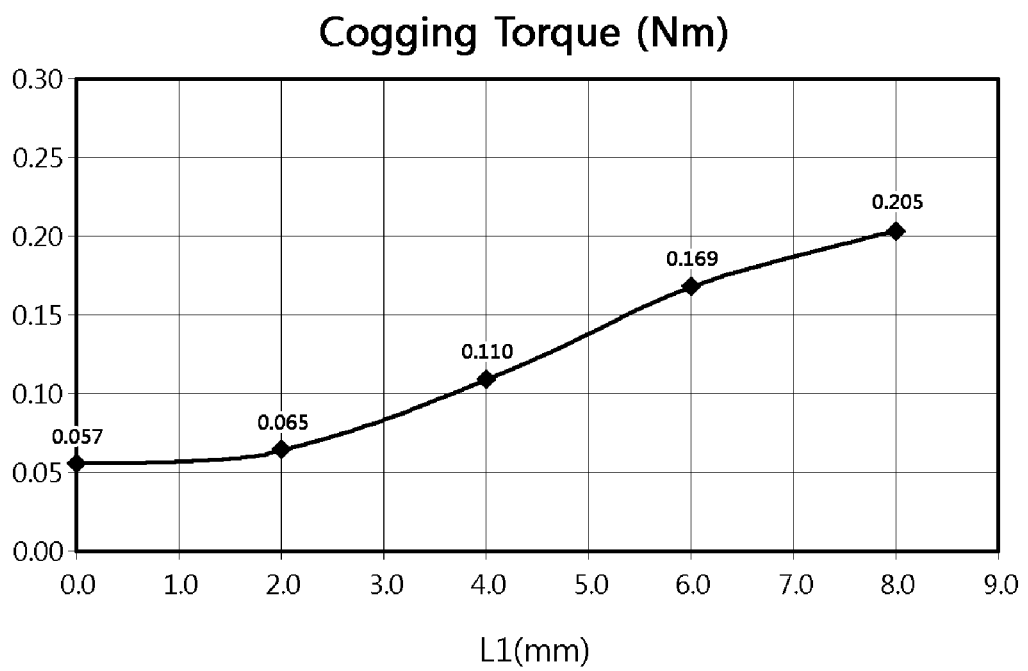
FIG. 8 is a graph illustrating a cogging torque of the brushless motor according to an exemplary embodiment of the present invention depending on L1.

FIG. 8 is a graph illustrating a change in a cogging torque according to L1. It is illustrated in FIG. 8 well that the shorter the length L1, the smaller the cogging torque, and the longer the length L1, the larger the cogging torque. In this case, it may be confirmed that the cogging torque is small (about 0.06) in a range in which the length L1 of the outer peripheral surface 23 of the central portion of the pole shoe 22 is 0 mm or more to 2 mm or less and becomes significantly large from a point where L2 is 2 mm. When considering this point, the length L1 of the outer peripheral surface 23 of the central portion of the pole shoe 22 may satisfy a relationship of 0 mm≤L1≤2 mm. In this case, it is more preferable that a standard of the outer peripheral surface 23 of the central portion of the pole shoe 22 is represented by θ4 in consideration of the fact that L1 may be changed according to an entire size of a device itself in a case where the entire size of the device itself is changed. Specifically, it is preferable that an angle θ4 between both distal ends of the outer peripheral surface 23 of the central portion of the pole shoe 22 satisfies a relationship of 0°≤θ4≤1.5°.

The outer peripheral surfaces 24 of both end portions of the pole shoe 22 may be formed in a planar shape. In this case, distal ends of the outer peripheral surfaces 24 of both end portions of the pole shoe 22 may be formed to be spaced apart from an extension line of the outer peripheral surface 23 of the central portion of the pole shoe 22 by a predetermined distance L2 in a radial direction. Therefore, (similar to a phenomenon according to a shape of the inner peripheral surfaces 14 of both end portions of the permanent magnet 12), it is possible to obtain an effect of gradually reducing and then gradually increasing again a change in the magnetoresistance while the rotor rotates. Also in this case, although not illustrated, the outer peripheral surfaces 24 of both end portions of the pole shoe 22 may be formed in a curved surface shape instead of the planar shape as long as they satisfy a condition that they become distant from the inner peripheral surface of the permanent magnet 12 as they become distant from the central portion.

Also in this case, similar to the case described above, it is more preferable that a standard of the outer peripheral surfaces 24 of both end portions of the pole shoe 22 is represented by any angle in consideration of the fact that L2 may be changed according to the entire size of the device itself in a case where the entire size of the device itself is changed. When an angle between the outer peripheral surfaces 24 of both end portions of the pole shoe 22 and a tangent of the outer peripheral surface 23 of the central portion of the pole shoe 22 at points where the central portion and both end portions of the pole shoe 22 meet each other is $\beta$, it is preferable that the angle $\beta$ satisfies a relationship of $7° \leq \beta \leq 9°$.

Association Design Between Shapes of Permanent Magnet and Pole Shoe

As described above, since the inner peripheral surfaces 14 of both end portions of the permanent magnet 12 have the chamfered shape or the outer peripheral surfaces 14 of both end portions of the pole shoe 22 have the chamfered shape, when the rotor rotates from the end of one pole to the next pole, the change in the magnetoresistance is gradually reduced and is then gradually increased again, such that the cogging torque may be effectively reduced. In this case, only the permanent magnet 12 may have the chamfered shape, only the pole shoe 22 may have the chamfered shape, or both of the permanent magnet 12 and the pole shoe 22 may have the chamfered shape.

Meanwhile, in a case of a brushless motor that is generally manufactured, the permanent magnet 12 has a height greater than that of the pole shoe 22, while the pole shoe 22 (formed of the electrical sheet) has a density greater than that of the permanent magnet 12. Materials, heights and the like of the permanent magnet 12 and the pole shoe 22 are summarized as in the following table.

|  | Material | Height (mm) | Density (kg/m$^3$) | Weight per Unit Area (kg/m$^2$) |
|---|---|---|---|---|
| Permanent Magnet | NMF-12BE | 20 | 5100 | 102 |
| Pole Shoe | 50PN470 | 16 | 7700 | 123.2 |

As represented in the above table, in a 2D cross-sectional design for performance improvement, a degree of a weight affected by a change in an area on a cross section is greater in the pole shoe (formed of the electrical sheet) than in the permanent magnet.

FIGS. 9A to 9C are views illustrating forms of a stator and a rotor of the brushless motor according to an exemplary embodiment of the present invention, several comparative examples, and weights and cogging torques in each case. FIG. 9A illustrates forms of the stator and the rotor of the brushless motor according to an exemplary embodiment of the present invention, and illustrates a case where both end portions of both of the permanent magnets 12 and the pole shoe 22 are formed in the chamfered shapes. In this case, of course, a weight is 0.791 g, which is the smallest, and a cogging torque is 0.100 Nm, which is the smallest, appears. Meanwhile, FIG. 9B illustrates a case where both end portions of only the pole shoe 22 are formed in the chamfered shape. In this case, a weight is 0.798 g, and a cogging torque is 0.227 Nm. FIG. 9C illustrates a case where both end portions of only the permanent magnet are formed in the chamfered shape. In this case, a weight is 0.802 g, and a cogging torque is 0.179 Nm.

The case where both end portions of both of the permanent magnets 12 and the pole shoe 22 are formed in the chamfered shapes as illustrated in FIG. 9A is the best, but there may be a case in which both end portions of only any one of the permanent magnets 12 and the pole shoe 22 need to be chamfered. In this case, as seen from comparison of FIGS. 9B and 9C, in the case where both end portions of only the pole shoe 22 are formed in the chamfered shape, a weight reduction effect is relatively large, but a cogging torque reduction effect is relatively small. On the other hand, in the case where both end portions of only the permanent magnet 12 are formed in the chamfered shape, a cogging torque reduction effect is relatively large, but a weight reduction effect is relatively small.

In this regard, even in the case where both end portions of both of the permanent magnet 12 and the pole shoe 22 are formed in the chamfered shape as illustrated in FIG. 9A, the weight reduction effect and the cogging torque reduction effect may be changed depending on how a chamfering degree of each component is determined. Meanwhile, in a case where the chamfering degree becomes excessively large, as described above (particularly with respect to a range of $\alpha$), a problem that the change in the magnetoresistance between the central portion and both end portions in each component is excessively large may occur. In this regard, it is necessary to perform optimization so as to prevent the change in the magnetoresistance from becoming excessively large at unnecessary points while appropriately improving both of the weight reduction effect and the cogging torque reduction effect.

When considering these several matters, it is preferable that the shapes of the permanent magnet 12 and the pole shoe 22 have the following association relationship. First, it is assumed that the inner peripheral surfaces 14 of both end portions of the permanent magnet 12 have the planar shape and are formed at the predetermined angle $\alpha$ with respect to the tangent of the inner peripheral surface of the central portion at the points where the central portion and both end portions of the permanent magnet 12 meet each other. In addition, it is assumed that the outer peripheral surfaces 24 of both end portions of the pole shoe 22 have the planar shape and the distal ends of the outer peripheral surfaces 24 of both end portions of the pole shoe 22 are formed to be spaced apart from the extension line of the outer peripheral surface 23 of the central portion of the pole shoe 22 by the predetermined distance L2 in the radial direction. In this case, it is preferable that the angle $\alpha$ between the inner peripheral surfaces 14 of both end portions of the permanent magnet 12 and the tangent of the inner peripheral surface 13 of the central portion of the permanent magnet at the points where the central portion and both end portions of the permanent magnet 12 meet each other and the angle $\beta$, between the outer peripheral surfaces 24 of both end portions of the pole shoe 22 and the tangent of the outer peripheral surface 23 of the central portion of the pole shoe 22 at the points where the central portion and both end portions of the pole shoe 22 meet each other satisfy a relationship of α>β.

The present invention is not limited to the embodiments described above, may be applied to various fields, and may be modified or improved by those skilled in the art without departing from the technical spirit of the present invention.

Industrial Applicability

In a motor according to the present invention, there is an effect of significantly reducing a cogging torque and significantly reducing a noise and vibrations of the motor by minimizing a change in a magnetoresistance according to rotation of a rotor. In addition, in the motor according to the present invention, there is an effect of more effectively reducing a weight of a component formed of a material having a high density and significantly reducing a weight of the motor itself ultimately.

What is claimed is:

1. A motor comprising:
a rotor including a plurality of permanent magnets disposed on an inner peripheral surface of a rotor core; and
a stator including a plurality of teeth disposed along a circumferential direction of a stator core and pole shoes formed at distal ends of the teeth facing the permanent magnets,
wherein when the rotor rotates, the permanent magnet becomes gradually close to an outer peripheral surface of a central portion of the pole shoe, passes through the outer peripheral surface of the central portion of the pole shoe, and then becomes gradually distant from the outer peripheral surface of the central portion of the pole shoe;
wherein an inner peripheral surface of a central portion of the permanent magnet is formed in a curved surface shape having a predetermined curvature, and inner peripheral surfaces of both end portions of the permanent magnet are formed so that the inner peripheral surfaces become distant from an outer peripheral surface of the pole shoe as the inner peripheral surfaces become distant from the central portion; and
wherein the inner peripheral surfaces of both end portions of the permanent magnet have a planar shape;
wherein the inner peripheral surfaces of both end portions of the permanent magnet are positioned on the same plane;
wherein the inner peripheral surfaces of the permanent magnet are formed to be symmetrical to each other with respect to a center line CL of the permanent magnet; and
wherein when a distance from a center C of rotation of the rotor to a distal end of a center of the pole shoe is D2 and a distance from the center C of rotation of the rotor to the inner peripheral surfaces of both end portions of the permanent magnet is D1, a relationship of D1 <D2 is satisfied.

2. A motor comprising:
a rotor including a plurality of permanent magnets disposed on an inner peripheral surface of a rotor core; and
a stator including a plurality of teeth disposed along a circumferential direction of a stator core and pole shoes formed at distal ends of the teeth facing the permanent magnets,
wherein when the rotor rotates, the permanent magnet becomes gradually close to an outer peripheral surface of a central portion of the pole shoe, passes through the outer peripheral surface of the central portion of the pole shoe, and then becomes gradually distant from the outer peripheral surface of the central portion of the pole shoe;
wherein an inner peripheral surface of a central portion of the permanent magnet is formed in a curved surface shape having a predetermined curvature, and inner peripheral surfaces of both end portions of the permanent magnet are formed so that the inner peripheral surfaces become distant from an outer peripheral surface of the pole shoe as the inner peripheral surfaces become distant from the central portion;
wherein the inner peripheral surfaces of both end portions of the permanent magnet have a planar shape;
wherein the inner peripheral surfaces of both end portions of the permanent magnet are formed at a predetermined angle a with respect to a tangent of the inner peripheral surface of the central portion of the permanent magnet at points where the central portion and both end portions of the permanent magnet meet each other; and
wherein the angle a between the inner peripheral surfaces of both end portions of the permanent magnet and the tangent of the inner peripheral surface of the central portion of the permanent magnet satisfies a relationship of $9° \le \alpha \le 20°$.

3. A motor comprising:
a rotor including a plurality of permanent magnets disposed on an inner peripheral surface of a rotor core; and
a stator including a plurality of teeth disposed along a circumferential direction of a stator core and pole shoes formed at distal ends of the teeth facing the permanent magnets,
wherein when the rotor rotates, the permanent magnet becomes gradually close to an outer peripheral surface of a central portion of the pole shoe, passes through the outer peripheral surface of the central portion of the pole shoe, and then becomes gradually distant from the outer peripheral surface of the central portion of the pole shoe;
wherein an inner peripheral surface of a central portion of the permanent magnet is formed in a curved surface shape having a predetermined curvature, and inner peripheral surfaces of both end portions of the permanent magnet are formed so that the inner peripheral surfaces become distant from an outer peripheral surface of the pole shoe as the inner peripheral surfaces become distant from the central portion; and
wherein when an angle between distal ends of both end portions of the permanent magnet with respect to a center C of rotation of the rotor is θ1 and an angle between both distal ends of the inner peripheral surface of the central portion of the permanent magnet is θ2, a relationship of $0.65 \le \theta2/\theta1 \le 0.67$ or $0.84 \le \theta2/\theta1 \le 0.86$ is satisfied.

4. The motor of claim 3, wherein when an angle between both distal ends of the pole shoe with respect to the center C of rotation of the rotor is θ3, a relationship of θ2<θ3 is satisfied.

5. A motor comprising:
a rotor including a plurality of permanent magnets disposed on an inner peripheral surface of a rotor core; and
a stator including a plurality of teeth disposed along a circumferential direction of a stator core and pole shoes formed at distal ends of the teeth facing the permanent magnets,
wherein when the rotor rotates, the permanent magnet becomes gradually close to an outer peripheral surface of a central portion of the pole shoe, passes through the outer peripheral surface of the central portion of the pole shoe, and then becomes gradually distant from the outer peripheral surface of the central portion of the pole shoe;

wherein an inner peripheral surface of a central portion of the permanent magnet is formed in a curved surface shape having a predetermined curvature, and inner peripheral surfaces of both end portions of the permanent magnet are formed so that the inner peripheral surfaces become distant from an outer peripheral surface of the pole shoe as the inner peripheral surfaces become distant from the central portion;

wherein outer peripheral surfaces of both end portions of the pole shoe are formed so that the outer peripheral surfaces become distant from the inner peripheral surface of the permanent magnet as the outer peripheral surfaces become distant from the central portion; and wherein the inner peripheral surfaces of both end portions of the permanent magnet have a planar shape, the inner peripheral surfaces of both end portions of the permanent magnet are formed at a predetermined angle a with respect to a tangent of the inner peripheral surface of the central portion at points where the central portion and both end portions of the permanent magnet meet each other, the outer peripheral surfaces of both end portions of the pole shoe have a planar shape, distal ends of the outer peripheral surfaces of both end portions of the pole shoe are formed to be spaced apart from an extension line of the outer peripheral surface of the central portion of the pole shoe by a predetermined distance L2 in a radial direction, and an angle a between the inner peripheral surfaces of both end portions of the permanent magnet and a tangent of the inner peripheral surface of the central portion of the permanent magnet at points where the central portion and both end portions of the permanent magnet meet each other and an angle $\beta$ between the outer peripheral surfaces of both end portions of the pole shoe and a tangent of the outer peripheral surface of the central portion of the pole shoe at points where the central portion and both end portions of the pole shoe meet each other satisfy a relationship of $\alpha > \beta$.

6. The motor of claim 5, wherein the outer peripheral surface of the central portion of the pole shoe is formed in a curved surface shape having a predetermined curvature.

7. The motor of claim 6, wherein when an angle between both distal ends of the outer peripheral surface of the central portion of the pole shoe with respect to a center C of rotation of the rotor is $\theta 4$, a relationship of $0° \leq \theta 4 \leq 1.5°$ is satisfied.

8. The motor of claim 5, wherein the outer peripheral surfaces of both end portions of the pole shoe have a planar shape.

9. The motor of claim 8, wherein when an angle between the outer peripheral surfaces of both end portions of the pole shoe and a tangent of the outer peripheral surface of the central portion of the pole shoe at points where the central portion and both end portions of the pole shoe meet each other is $\beta$, a relationship of $7° \leq \beta \leq 9°$ is satisfied.

* * * * *